Nov. 14, 1950     F. H. NICOLL ET AL     2,529,703
PRODUCTION OF LOW REFLECTANCE
SKELETONIZED SURFACE ON GLASS
Original Filed May 28, 1943
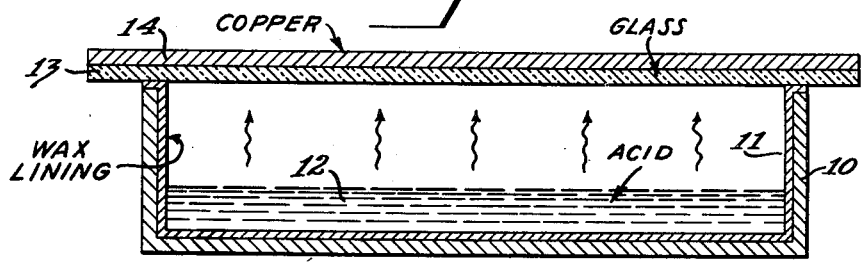
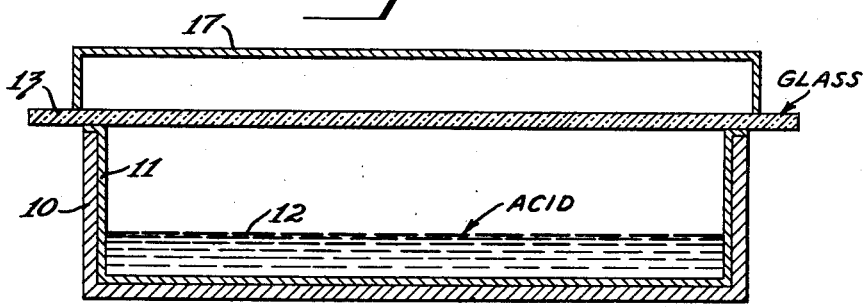
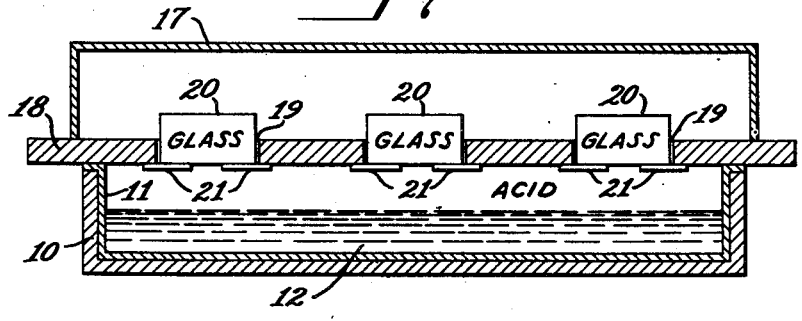
Inventors
Frederick H. Nicoll
& Ferd E. Williams
By C. D. Tuska
Attorney Patented Nov. 14, 1950

2,529,703

UNITED STATES PATENT OFFICE 2,529,703

PRODUCTION OF LOW REFLECTANCE SKELETONIZED SURFACE ON GLASS

Frederick H. Nicoll and Ferd E. Williams, Princeton, N. J., assignors to Radio Corporation of America, a corporation of Delaware Original application May 28, 1943, Serial No. 488,938. Divided and this application October 8, 1946, Serial No. 701,903

6 Claims. (Cl. 41—42)

This application is a division of an application of Nicoll and Williams, Serial No. 488,938, filed May 28, 1943, for "Low Reflective Elements," now abandoned. The invention relates to the production of a low reflectance skeletonized surface on glass which reduces the intensity of reflected light by the well-known interference effect, and more particularly to an improved method of producing a skeletonized interference film by means of vapor emanated from hydrofluoric acid in which organic materials are dissolved.

The treatment of glass to reduce surface reflections by subjecting the glass to fumes of hydrofluoric acid is described and claimed in a copending application of F. H. Nicoll, Serial No. 461,958, filed October 14, 1942, now Patent No. 2,461,840, February 15, 1949, and assigned to the same assignee as the present application. In accordance with the copending application, the glass surface is treated with dilute hydrofluoric acid vapor under conditions promoting substantially uniform gas concentration and distribution at the treated surface, the treated surface being maintained at a temperature higher than that of the acid solution in order to prevent condensation of moisture at the treated surface, and the treatment being continued until an interference film or layer skeletonized to the desired extent and having the desired thickness is formed. As is well known, the thickness of the skeletonized region, or film, is equal to a quarter wavelength of a component of visible light, or an odd integral multiple thereof.

While the method of treatment disclosed by the aforesaid application has proved satisfactory in many respects, the necessity of maintaining a temperature difference between the treated surface and hydrofluoric acid bath or solution is a complication which it is desirable to avoid. The earlier method also involves rather exact control in order to insure uniform gas distributon and concentration at the surface undergoing treatment, and also to insure conditions suitable for the formation of hard films.

The present invention has for its principal object the provision of an improved method of operation which avoids the necessity of maintaining a fixed temperature difference between the treated surface and the solution from which the active components are derived.

Another object is the provision of an improved method of operation whereby the concentration and distribution of the active gas is rendered more uniform, and the conditions for hard film formation are made less critical.

In avoiding the problem of maintaining the treated surface and the acid solution at different temperatures, two different methods of approach were discovered. The first of these methods herein claimed involves lowering of the vapor pressure of water above the dilute acid bath by dissolving foreign substances in it. The second of these methods claimed in the application of which this is a division, involves the use of a bath of fluosilicic acid instead of the dilute hydrofluoric acid previously used. By both methods, the necessity of a temperature difference between the bath and treated surface is avoided.

In general, both the improved methods involve the same preparatory treatment as that set forth in the aforesaid application. The apparatus used in practicing the two improved methods differs from that used in connection with the previous method in that the bath container is preferably of metal and a metal sheet or tray is placed in contact with the untreated surface of the glass to insure uniform temperature distribution and no cooling bath is required.

The improved method which involves the dissolving of foreign substances in the bath for the purpose of lowering its vapor pressure is now described.

Glass in contact with saturated water vapor is known to have a thin film of water adsorbed on its surface. A soluble, so-called "white deposit" is formed during the production of the skeletonized film by the hydrofluoric acid vapor method. This deposit consists of fluorides and fluosilicates. Also, water is a product of the reaction between the glass and hydrogen fluoride. These facts indicate that during the film formation a thin solution, saturated with respect to alkali and alkaline earth fluorides and fluosilicates, exists at the glass surface, while an inch or two below the glass is a dilute hydrofluoric acid solution. The solution on the glass surface, because of the dissolved salts, has a much lower vapor pressure than the dilute hydrofluoric acid solution in the tray when the two are at the same temperature. In order to keep the adsorbed solution on the glass surface at the proper concentration and thickness, it is desirable that the vapor pressure of the two solutions be made more nearly equal. In fact, it would seem advisable to have the adsorbed solution with a slightly higher vapor pressure so that water, a product of the reactions, will be removed at the proper rate. This will effectively prevent the transfer of water from the solution to the surface of the glass.

In the earlier method, maintaining the temperature of the glass several centigrade degrees above the temperature of the acid solution raised the vapor pressure of the adsorbed salt solution a sufficient amount to prevent the undesired transfer of water to the glass and thus to produce a skeletonized film which is hard and insoluble. As previously indicated, this method has the disadvantage that it requires the maintenance of a temperature difference between the treated surface and the acid solution or both.

One way of avoiding this difficulty involves lowering the water vapor pressure of the dilute acid solution by dissolving foreign substances in it. Except for silver fluoride which is very difficult to prepare, such substances as fluorides, acid fluorides, and fluosilicates are not soluble enough to reduce sufficiently the water vapor pressure of the weak hydrofluoric acid solution to give the hardest type of film. Only a slightly soft film or coating can be produced with these dissolved materials with no difference between the temperatures of the treated surface and the acid solution. In view of this fact, attention was directed to foreign substances other than dissolved salts.

The substance to be dissolved in the dilute hydrofluoric acid solution must be miscible with the acid in proportions great enough to produce the desired vapor pressure reduction, must be inert to dilute hydrofluoric acid, and preferably should have a vapor pressure low enough, that is, a boiling point high enough, to prevent appreciable wetting of the treated surface. Lowering the vapor pressure in this manner effectively prevents the transfer of water from the solution to the surface of the glass.

Organic substances such as ethylene glycol, propylene glycol, dipropylene glycol, butyl "carbitol," diethanolamine and triethanolamine have the required properties. Ethylene glycol was found to be particularly satisfactory because of its availability and because of its low molecular weight. The lowering of the vapor pressure by Raoult's law is proportional to the mole fraction of the dissolved substance.

It is a further object of this invention to provide an improved method of producing a skeletonized interference film by means of vapor emanated from a hydrofluoric acid solution in which organic substances have been dissolved to lower the effective vapor pressure of the solution.

A still further object of this invention is to provide an improved method of providing the required balance between the vapor pressure of an acid solution used to skeletonize glass and the vapor pressure of the solution on the surface of the glass without resorting to a temperature differential.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Fig. 1 is a sectional view of one embodiment of the apparatus employed in practicing the invention, and Figs. 2 and 3 are sectional views of alternate embodiments of apparatus useful in practicing the invention.

Referring to Fig. 1, this method may be practiced by putting into a copper tray 10, twelve inches square by one and three-quarter inches deep and provided with a wax lining 11, a solution 12 containing 215 cubic centimeters of water, 4 cubic centimeters of 48% hydrofluoric acid and 180 cubic centimeters of ethylene glycol. The resulting solution consists of 45 volume % ethylene glycol and 55 volume % of 1% hydrofluoric acid or may be referred to as 21 mole % ethylene glycol. If a lower concentration of glycol, about 25 volume %, is used, moisture appears on the treated surface and the film is soft and easily removed by rubbing. If a high concentration of glycol, about 65 volume %, is used, a water soluble film results. Concentrations of glycol between 30 volume % and 45 volume % produce satisfactory films or coatings, the hardest film resulting at the higher limit of glycol concentration.

The previously mentioned 45 volume % (21 mole %) ethylene glycol at 25° C. has experimentally a vapor pressure of 19 mm. of mercury. The mole fraction of water being 0.79, the vapor pressure by Raoult's law should be 0.79 of 23.76 or 18.8 mm. at 25° C. This agrees with the experimental values. This solution at 25° C. has the same vapor pressure as a 1% hydrofluoric acid solution at 21° C.

Over the tray 10 is placed a twelve inch square glass sheet 13 covered with a copper plate 14. The length of treatment required to produce a coating of the required thickness is about seven hours in case the glass is to be made non-reflective to green light. At the end of the treatment, the glass is removed and the "white deposit" is washed off. The skeletonized, low index, insoluble film shows very low reflection of light having a wavelength four times the thickness of the coating. The theory of non-reflective coatings is well known and need not be described here.

Referring to Fig. 2, an alternative arrangement is shown for eliminating drafts and unequal temperature. It will be seen that the tray 10 is lined, is provided with the acid solution 12, and is covered by the glass 13 to be treated. In these respects the apparatus of Fig. 2 is similar to that of Fig. 1. The copper plate 14 of Fig. 1 is replaced by an inverted tray or lid 17, which is preferably made of metal, and which traps the air in an enclosed space so as to eliminate air currents and maintain a uniform temperature distribution.

When several small pieces of glass are to be treated, the apparatus of Fig. 3 may be used. In this arrangement the tray 10 is covered by a metal plate 18 which is provided with openings 19. The openings are adapted to receive the glass pieces 20 to be treated. The several pieces 20 may be supported by fine wires 21. The supporting wires may be soldered or otherwise fastened to the metal plate. This method of treating small pieces has been found to give uniform films to within $\frac{1}{16}$" of the edge of the treated surface.

What we claim is:

1. The method of reducing the index of refraction of glass which includes the steps of exposing said glass to vapor emanating from a solution of hydrofluoric acid containing a dissolved substance which is chemically inert with said acid, the quantity of said substance being calculated to reduce the vapor pressure of said solution to a value not exceeding the vapor pressure of the solution produced by the action of said acid on the surface of said glass being treated, and continuing said exposure until a desired interference color is observed on said glass.

2. The method of reducing the index of refraction of glass which includes the steps of exposing said glass to vapor emanating from a solution of hydrofluoric acid containing a dissolved substance which is chemically inert with said acid, the quantity of said substance being calculated to reduce the vapor pressure of said solution to a value of the order of 19 mm. of mercury, and continuing said exposure until predetermined interference color is observed.

3. The method of reducing the index of refraction of glass which includes the steps of exposing said glass to vapor emanating from a solution of 45 volume % of ethylene glycol and 55 volume % of 1% hydrofluoric acid, and continuing said treatment until a predetermined interference color is observed when the surface of said glass is observed in white light.

4. The method of reducing the index of refraction of glass which includes the steps of exposing said glass to vapor emanating from a solution containing between 30 volume % and 45% ethylene glycol and the balance a 1% solution of hydrofluoric acid, and continuing said treatment until a predetermined interference color is observed when the surface of said glass is observed in white light.

5. The method of reducing the index of refraction of glass which includes the steps of exposing a surface of said glass to vapor emanating from a solution of hydrofluoric acid containing an organic substance of low vapor pressure which is chemically inert with respect to said acid and in such quantity as to effectively prevent the transfer of water from said solution to said surface, and continuing said exposure until the index of refraction of said glass is reduced a predetermined amount.

6. The method of reducing the index of refraction of glass which includes the steps of exposing a surface of said glass to vapor emanating from a solution of hydrofluoric acid containing an organic substance chemically inert with respect to said acid which is miscible in the solution and having a vapor pressure lower than that of water, the quantity of said substance being between the approximate limits of 30% and 45% by volume whereby the condensation of water on said surface is effectively prevented, maintaining said solution and said glass at the same temperature, and continuing said exposure until an effective interference film is produced on said glass, the thickness of said film being of the order of a quarter wavelength of a component of visible light.

FREDERICK H. NICOLL.
FERD E. WILLIAMS.

REFERENCES CITED

The following references are of record in the file of this patent:

UNITED STATES PATENTS

| Number | Name | Date |
|---|---|---|
| 152,059 | Archer | June 16, 1874 |
| 276,894 | Schulze-Berge | May 1, 1883 |
| 1,976,039 | Rowall | Oct. 9, 1934 |
| 1,997,375 | Naruse | Apr. 9, 1935 |
| 2,184,320 | Simpson | Dec. 26, 1939 |
| 2,215,039 | Hood | Sept. 17, 1940 |
| 2,461,840 | Nicoll | Feb. 15, 1949 |